(12) United States Patent
Barkam et al.

(10) Patent No.: US 11,393,315 B1
(45) Date of Patent: Jul. 19, 2022

(54) HAZARD INDICATOR

(71) Applicant: Micron Technology, Inc., Boise, ID (US)

(72) Inventors: Swetha Barkam, Meridian, ID (US); Bhumika Chhabra, Boise, ID (US); Kathryn H. Russo, Boise, ID (US); Zhao Zhao, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/340,601

(22) Filed: Jun. 7, 2021

Related U.S. Application Data

(60) Provisional application No. 63/132,579, filed on Dec. 31, 2020.

(51) Int. Cl.
*G06K 9/00* (2022.01)
*G08B 21/02* (2006.01)
*G08B 5/22* (2006.01)

(52) U.S. Cl.
CPC ............. *G08B 21/02* (2013.01); *G08B 5/223* (2013.01)

(58) Field of Classification Search
CPC .... G08B 21/02; G08B 5/223; H04N 5/23293; G01S 19/13; G01S 15/93; G01S 15/025; G01S 15/08; G06K 9/00577
See application file for complete search history.

(56) References Cited

U.S. PATENT DOCUMENTS

| | | | | |
|---|---|---|---|---|
| 8,953,841 B1 * | 2/2015 | Leblang | ................. | G06V 20/20 |
| | | | | 382/103 |
| 9,582,976 B2 * | 2/2017 | Chin | ..................... | A01M 29/24 |
| 9,654,675 B2 * | 5/2017 | Kessler | .................. | G03B 17/17 |
| 10,200,581 B2 * | 2/2019 | Hartwell | ............. | H04N 5/2254 |
| 10,311,304 B2 * | 6/2019 | Bender | ................ | G08B 25/016 |
| 10,360,437 B2 * | 7/2019 | Obaidi | .................... | G06F 3/011 |
| 10,425,525 B1 * | 9/2019 | Bitetto | .................. | G08B 21/24 |
| 10,852,154 B1 * | 12/2020 | Knas | ................. | G01C 21/3661 |
| 10,902,263 B1 * | 1/2021 | Angel | ..................... | A61H 3/061 |
| 2011/0298614 A1 | 12/2011 | Bells | | |
| 2012/0032806 A1 | 2/2012 | Lee | | |
| 2012/0264406 A1 * | 10/2012 | Mohler | ............. | H04M 1/72454 |
| | | | | 455/414.1 |

(Continued)

*Primary Examiner* — An T Nguyen
(74) *Attorney, Agent, or Firm* — Brooks, Cameron & Huebsch, PLLC

(57) ABSTRACT

Apparatuses, machine-readable media, and methods related to hazard indicators are described. Determining whether hazards exists and the location of a hazard can be helpful when moving about. Computing devices (e.g., mobile devices and/or cloud-based computers) can be configured to run an application (e.g., a hazard indication tool) to determine that a hazard exists and indicate to a user of a computing device that the hazard exists according to examples of the present disclosure. A user can carry a mobile device with them while they are walking or running. The mobile device can include a number of sensors (e.g., image sensors, microphones, infrared (IR) sensors, ultrasonic sensors, location sensors) to generate data that can be used by a hazard indication tool to determine if a hazard exists. The hazard indication tool can output a warning that indicates to a user that a hazard exists, an alternate route to avoid the hazard, and/or generate a hazard library that other users can use to obtain information about hazards.

17 Claims, 4 Drawing Sheets

(56) References Cited

U.S. PATENT DOCUMENTS

| | | | |
|---|---|---|---|
| 2013/0244731 A1 | 9/2013 | Oishi | |
| 2013/0293586 A1* | 11/2013 | Kaino | G06F 3/14 |
| | | | 345/633 |
| 2013/0325325 A1* | 12/2013 | Djugash | G01C 21/3697 |
| | | | 701/425 |
| 2014/0066097 A1 | 3/2014 | Kolodziej | |
| 2014/0274205 A1* | 9/2014 | Goszyk | G01S 17/93 |
| | | | 250/341.8 |
| 2015/0371518 A1* | 12/2015 | Mittal | G08B 21/182 |
| | | | 340/539.11 |
| 2016/0057726 A1* | 2/2016 | Bai | G01S 1/00 |
| | | | 340/686.6 |
| 2016/0091606 A1* | 3/2016 | Shin | G01S 15/08 |
| | | | 367/99 |
| 2016/0155002 A1* | 6/2016 | Chang | G08B 21/02 |
| | | | 348/158 |
| 2016/0246449 A1 | 8/2016 | Jarske | |
| 2017/0043717 A1* | 2/2017 | Heiman | G08G 1/096775 |
| 2017/0263125 A1* | 9/2017 | Tanabe | H04L 67/12 |
| 2018/0204437 A1 | 7/2018 | Singh | |
| 2018/0225513 A1* | 8/2018 | Bender | G08B 21/24 |
| 2018/0276969 A1* | 9/2018 | Obaidi | G06V 10/17 |
| 2018/0300771 A1 | 10/2018 | Roger | |
| 2020/0064141 A1* | 2/2020 | Bell | G01C 21/3661 |
| 2020/0090501 A1* | 3/2020 | Gilbertson | H04W 4/90 |
| 2020/0413237 A1* | 12/2020 | Stowell | G08B 7/062 |

\* cited by examiner

HAZARD INDICATOR

PRIORITY INFORMATION

This application is a Non-Provisional application of U.S. Provisional application No. 63/132,579, filed Dec. 31, 2020, the contents of which are herein incorporated by reference.

TECHNICAL FIELD

The present disclosure relates generally to apparatuses, non-transitory machine-readable media, and methods for indicating a hazard to a user.

BACKGROUND

A computing device is a mechanical or electrical device that transmits or modifies energy to perform or assist in the performance of human tasks. Examples include thin clients, personal computers, printing devices, laptops, mobile devices (e.g., e-readers, tablets, smartphones, etc.), internet-of-things (IoT) enabled devices, and gaming consoles, among others. An IoT enabled device can refer to a device embedded with electronics, software, sensors, actuators, and/or network connectivity which enable such devices to connect to a network and/or exchange data. Examples of IoT enabled devices include mobile phones, smartphones, tablets, phablets, computing devices, implantable devices, vehicles, home appliances, smart home devices, monitoring devices, wearable devices, devices enabling intelligent shopping systems, among other cyber-physical systems.

A computing device can include a display used to view images and/or text, speakers to emit sound, and/or a sensors to collect data. The display can be a touchscreen display that serves as an input device. When a touchscreen display is touched by a finger, digital pen (e.g., stylus), or other input mechanism, associated data can be received by the computing device. The touchscreen display may include pictures and/or words, among others that a user can touch to interact with the device.

DETAILED DESCRIPTION

Figure 1:
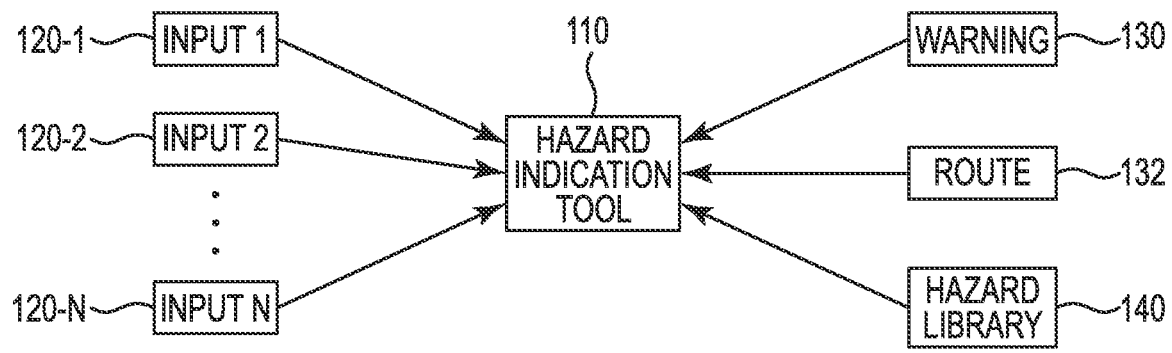
FIG. 1 is a functional diagram representing an example system for a hazard indicator in accordance with a number of embodiments of the present disclosure.

Apparatuses, machine-readable media, and methods related to hazard indicators are described. Determining whether hazards exists and the location of a hazard can be helpful when moving about. Computing devices (e.g., mobile devices and/or cloud-based computers) can be configured to run an application (e.g., a hazard indication tool) to determine that a hazard exists and indicate to a user of a computing device that the hazard exists according to examples of the present disclosure. A user can carry a mobile device with them while they are walking or running. The mobile device can include a number of sensors (e.g., image sensors, microphones, infrared (IR) sensors, ultrasonic sensors, location sensors) to generate data that can be used by a hazard indication tool to determine if a hazard exists. The hazard indication tool can output a warning that indicates to a user that a hazard exists, an alternate route to avoid the hazard, and/or generate a hazard library that other users can use to obtain information about hazards.

A mobile device can be carried by a user and include a number of sensors. The number of sensors can collect data, such as image, audio, infrared (IR), ultrasonic, and/or location (e.g., GPS) data, among other types of data. The data from the sensors can be used by the hazard indication tool to determine if a hazard exists. For example, image data can indicate that a road and/or sidewalk is under construction, which would be a hazard that the user would want to avoid. Another example can include that audio and/or image data can indicate that an emergency, such as a medical or fire emergency, is taking place and is a hazard that the user would want to avoid. Another example is that image data can indicate that the user is approaching an immediate hazard, such as entering an intersection with traffic or veering off a sidewalk. The image data capture by the user's mobile device can be used by the hazard indication tool to determine that the user is approaching an immediate hazard. The hazard indication tool can provide a warning of the immediate hazard to the user via an audible warning, such as an alarm, a vibration warning that causes the user's mobile device to vibrate, and/or a visual warning, such as a flashing indicator on the display of the user's mobile device.

The hazard indication tool can provide a warning to the user that the hazard exists and provide an alternate route to for the user to take to avoid the hazard. The hazard indication tool on a user's mobile device can give an audible warning when a user is approaching a hazard. For example, the hazard indication tool can cause the mobile device to sound an audible warning that states "$2^{nd}$ Avenue is closed between $5^{th}$ and $7^{th}$ Streets, please proceed to $3^{rd}$ Avenue to avoid this closure." The hazard indication tool can also provide a map for the user to view on their mobile device that indicates where the hazard is located, the type of hazard, and an alternate route to avoid the hazard.

The hazard indication tool can create a hazard library that includes information about the hazard's detected by the hazard indication tool. The hazard library can be available to other users that are using the hazard indication tool on their mobile devices. For example, when the hazard indication tool determines that hazard exists, such a fire emergency, using image and audio data from a user's mobile device, the hazard indication tool can create this hazard in the hazard library and send a warning to other users of the hazard indication tool that are near the hazard.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, designators such as "N," "M," etc., particularly with respect to reference numerals in the drawings, indicate that a number of the particular feature so designation can be included. It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures can be identified by the use of similar digits. For example, 120 can reference element "20" in FIG. 1, and a similar element can be referenced as 220 in FIG. 2. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional diagram representing an example system for a hazard indicator in accordance with a number of embodiments of the present disclosure. The system can include inputs 120-1, 120-2, 102-N from computing devices of a number of users. Inputs 120-1, 120-2, 102-N can be sensor data from mobile devices of a number of users and/or data that is manually input by users into the mobile devices of the users.

The hazard indication tool 110 can be located on a computing device, such as a computing device of user and/or a cloud based computing device that is wirelessly coupled to the computing devices of users. Hazard indication tool 110 can be an application that is run using processing resources and/or memory resources of a computing device. Hazard indication tool 100 can received inputs 120-1, 120-2, 102-N from a number of users and determine whether a hazard exists and details about the hazard, such as the type of hazard, the location of the hazard, an amount of time that the hazard has existed or will exist, among other details.

Hazard indication tool 110 can output a warning 130 to users of the hazard indication tool that a hazard exists. The warning 130 can be an audible warning, a visual warning, and/or a vibrating warning, for example. An audible warning can cause the speakers on a user's mobile device to sound an alarm or to provide details to the about the location and type of hazard. For example, warning 130 can indicate to a user that they are approaching a protest and/or demonstration that is block pedestrian and/or automobile traffic. Also, warning 130 can be alarm that is sounded by the user's mobile device or a flashing indicator on the display of the user's mobile device to indicate that that user is approaching an immediate hazard, such as entering an intersection with traffic.

Hazard indication tool 100 can output an alternate route 132 to users of the hazard indication tool to allow the users to avoid a hazard. The alternate route 132 can be indicated on a map on the user's mobile device. For example, the alternate route can show the hazard on the map, provide details regarding the type of hazard, such as when the hazard was identified and how long the hazard is expected to remain, and provide a route on the map to avoid the hazard.

Hazard indication tool 110 can create a hazard library 140. Hazard library 140 include information regarding the hazards that the hazard indication tool 110 has detected. Hazard library 140 can include the type of hazard, the location of the hazard, the day and time that the hazard was identified, and how long the hazard is expected to remain, among other types of information regarding the hazards. Hazard library 140 can be used by the hazard indication tool 110 to inform and warn users of the hazard indication tool 110 that they are approaching a hazard. For example, hazard indication tool 100 can receive location data from a user and compare the location data to location data of hazards in hazard library 140. If the user is approaching a hazard in the hazard library 140, the hazard indication tool 110 can send a warning 130 of the hazard to the user and/or send an alternate route 132 to the user so the user can avoid the hazard.

Hazard library 140 can also be accessed by users of the hazard indication tool 110 to locate hazards before the users begin traveling a route. For example, a user can use the hazard library 140 to locate hazards in a particular area and determine whether or not they need to avoid the particular area based on the information regarding hazards in the hazard library. The information in the hazard library 140 can also be used by the hazard indication tool 110 to generate alternate routes 132 for a user to take to avoid hazards before the user begins their journey.

Figure 2:
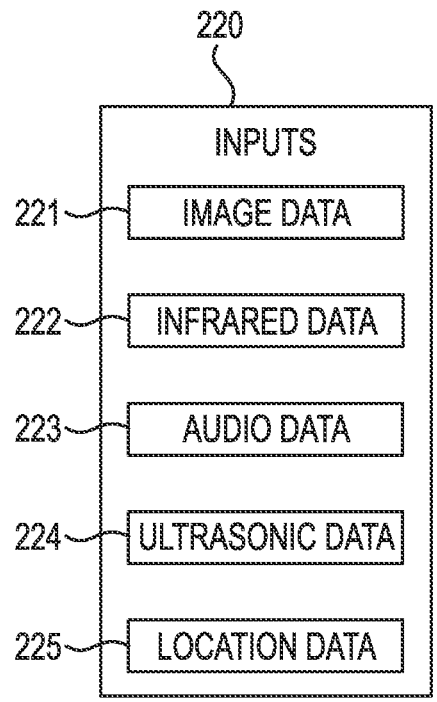
FIG. 2 is a diagram representing example of inputs for a hazard indicator in accordance with a number of embodiments of the present disclosure.

FIG. 2 is a diagram representing example of inputs 220 for a hazard indicator in accordance with a number of embodiments of the present disclosure. A hazard indication tool can receive inputs 220 to determine whether a hazard exists and determine information regarding a hazard. Inputs 220 can include data from sensors on a user's mobile device. Inputs 220 can include image data 221 from a user's mobile device. The image data 221 can be video data and/or photographic data. An image sensor from a user's mobile device can provide image data to the hazard indication tool that provide information regarding the surroundings of a user. For example, the image data 221 can provide panoramic image data that indicates the user is entering an intersection with approaching traffic. Also, image data 221 can provide information to indicate that an emergency vehicle is present or that the user is approaching traffic congestion.

Inputs 220 can include infrared (IR) data 222 from a user's mobile device. An IR sensor from a user's mobile device can provide IR data to the hazard indication tool that provide information regarding the surroundings of a user. For example, the IR data 222 can provide IR data that indicates the user is approaching a hazard.

Inputs 220 can include audio data 223 from a user's mobile device. The audio data 223 can be audio recording of sound detected by the microphone of a user's mobile device. A microphone from a user's mobile device can provide audio data to the hazard indication tool that provide information regarding the surroundings of a user. For example, the audio data 223 can provide an indication that a user is approaching an emergency based upon audio data 223 of an emergency vehicles siren or audio data 223 of vehicles crashing or a loud crowd.

Inputs 220 can include ultrasonic data 224 from a user's mobile device. A microphone from a user's mobile device can provide ultrasonic data to the hazard indication tool that provide information regarding the surroundings of a user. For example, the ultrasonic data 224 can provide data that indicates the user is approaching a hazard.

Inputs 220 can include location 225 from a user's mobile device. The location data 225 can be GPS data that indicates the location of the user's mobile device. The location data 225 can also be data from sensors of the user's mobile device that indicate movement of the mobile device. The location data 225 can be used by the hazard indication tool to determine a location of a hazard, whether a hazard exists, and/or how to avoid the hazard via an alternate route. The location data 225 can be used by the hazard indication tool to determine if a user is approaching a hazard.

Figure 3:
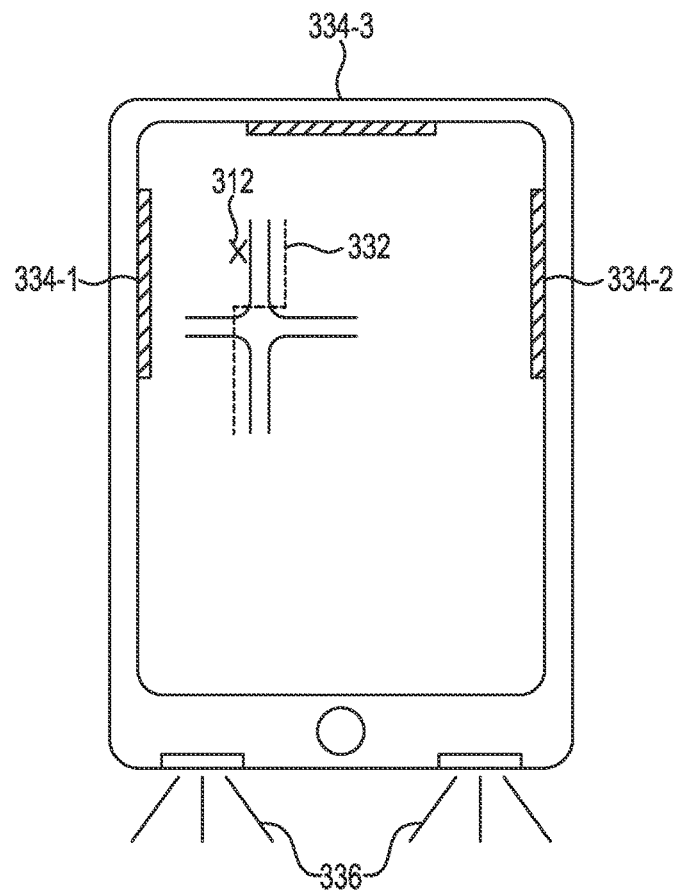
FIG. 3 is a diagram representing an example of a computing device including a display and speakers in accordance with a number of embodiments of the present disclosure.

FIG. 3 is a diagram representing an example of a computing device 350 including a display and speakers in accordance with a number of embodiments of the present disclosure. Computing device 350 can be a user's mobile device can be configured to run a hazard indication tool application. Also, computing device 350 can be wirelessly connected to a hazard indication tool application that is operated on a cloud based computing device. Computing device 350 can include a display that can be used to provide information regarding hazards to a user. Computing device 350 can display a map that indicates a location of a hazard 312 and an alternate route 332 to avoid the hazard. For example, in FIG. 3, computing device 350 can display a map that indicates a hazard 312 is located on the left hand side of the street that the user is approaching. The map can also include alternate route 332 that indicates to the user that they should cross to the right hand side of the street at the next intersection.

Computing device 350 can provide visual warnings 334-1, 334-2, and 334-3 to a user that they are approaching a hazard. Visual warnings 334-1, 334-2, and 334-3 can be shown on the display of computing device 350 to indicate that the user is approaching a hazard. Visual warnings 334-1, 334-2, and 334-3 can flash on the display of computing device 350. For example, visual warning 334-1 can flash on the left side of the display of the computing device 350 to indicate that the user is approaching a hazard on the left, such as the user is about to step off the curb and into the street on their left. Visual warning 334-2 can flash on the right side of the display of the computing device 350 to indicate that the user is approaching a hazard on the right, such as the user is about to walk into a building on their right. Visual warning 334-3 can flash on the top of the display of the computing device 350 to indicate that the user is approaching a hazard ahead, such as the user is about to enter an intersection with approaching traffic.

Computing device 350 can provide audio warnings 336 to a user that they are approaching a hazard. Audio warnings 336 can be emitted by speakers of computing device 350 to indicate that the user is approaching a hazard. Audio warnings 336 can include an alarm sound to alert the user of hazard they are approaching. Audio warnings 336 can also provide details of a hazard to a user, such as a verbal indication of the type of hazard, the location of the hazard, and/or an alternate route to avoid the hazard.

Figure 4:
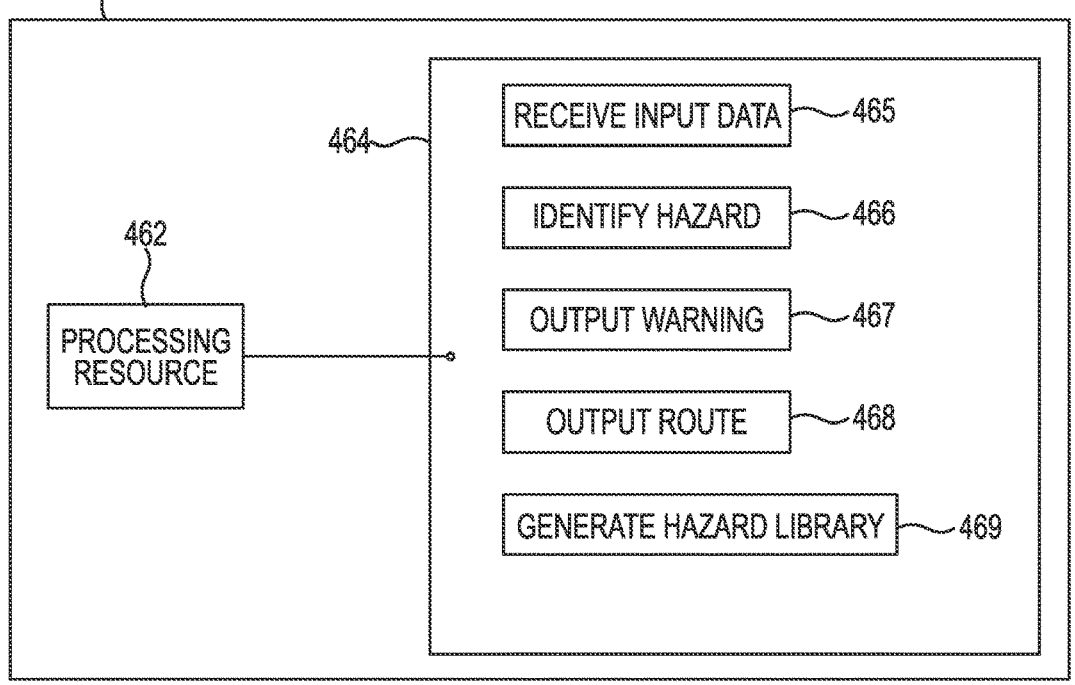
FIG. 4 is a functional diagram representing a processing resource in communication with a memory resource having instructions written thereon in accordance with a number of embodiments of the present disclosure.

FIG. 4 is a functional diagram representing a processing resource 462 in communication with a memory resource 464 having instructions 465, 466, 467, 468, and 469 written thereon in accordance with a number of embodiments of the present disclosure. In some examples, the processing resource 462 and memory resource 464 comprise a system 460 such as a hazard indicator tool (e.g., hazard indicator tool 110 illustrated in FIG. 1).

The system 460 illustrated in FIG. 4 can be a server (e.g., a cloud-based computing device) and/or computing device (e.g., a mobile device), among other computing device and can include the processing resource 462. The system 460 can be coupled to other systems and/or computing devices (e.g., coupled via a wireless network). The system 460 can further include the memory resource 464 (e.g., a non-transitory MRM), on which may be stored instructions, such as instructions 465, 466, 467, 468, and 469. Although the following descriptions refer to a processing resource and a memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

The memory resource 464 may be electronic, magnetic, optical, or other physical storage device that stores executable instructions. Thus, the memory resource 464 may be, for example, non-volatile or volatile memory. For example, non-volatile memory can provide persistent data by retaining written data when not powered, and non-volatile memory types can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory, resistive random access memory (RRAM), ferroelectric random access memory (FeRAM), magnetoresistive random access memory (MRAM), and programmable conductive memory, among other types of memory. Volatile memory can require power to maintain its data and can include random-access memory (RAM), dynamic random-access memory (DRAM), and static random-access memory (SRAM), among others.

In some examples, the memory resource 464 is a non-transitory MRM comprising Random Access Memory (RAM), an Electrically-Erasable Programmable ROM (EEPROM), a storage drive, an optical disc, and the like. The memory resource 464 may be disposed within a controller and/or computing device. In this example, the executable instructions 465, 466, 467, 468, and 469 can be "installed" on the device. Additionally, and/or alternatively, the memory resource 464 can be a portable, external or remote storage medium, for example, that allows the system to download the instructions 465, 466, 467, 468, and 469 from the portable/external/remote storage medium. In this situation, the executable instructions may be part of an "installation package". As described herein, the memory resource 464 can be encoded with executable instructions for indicating a hazard.

The instructions 465, when executed by a processing resource such as the processing resource 462, can include instructions to receive at the processing resource 462, the memory resource 464, or both, a plurality of input data from a plurality of sources, the plurality of sources comprising mobile devices of users. In some examples, the plurality of input data can include, or any combination thereof. For instance, data may be manually entered via an application of a mobile device for sending to the processing resource 464 or automatically (e.g., with little or no human intervention) to the processing resource 464.

The instructions 466, when executed by a processing resource such as processing resource 462, can include instructions to identify a hazard. For instance, processing resource 464 can identify a hazard based on the plurality of input data. In some examples, the instructions can be executable to identify a hazard, based on received input data from the mobile device of the users.

The instructions 467, when executed by a processing resource such as the processing resource 462, can include instructions to output a warning that indicates a hazard exist. The instructions can output a warning in the form of an audible warning, such an alarm or words that are spoken to describe the hazard, for example, and/or a visual warning, such as a flashing light or an indication of the location and the type of hazard on a map, for example.

The instructions 468, when executed by a processing resource such as the processing resource 462, can include instructions to output a route to avoid the hazard based at least in part on the input data and the identification of the hazard by the processing resource 462.

The instructions 469, when executed by a processing resource such as the processing resource 462, can include instructions to generate a hazard library that includes location, type, and/or temporal data associated with the hazard that are identified by the processing resource 462. The hazard library can be communicated to and/or accessed by other users such that the other users may be made aware of hazards that they may be approaching and may be provided an alternate route to avoid the hazard. The hazard library can be stored in memory resource 464. The processing resource 462 can include instructions to receive location of data of other users and provide a warning and/or an alternate route to users in response to the processing resource 462 executing instructions that users are approaching hazards that are stored in the hazard library.

Figure 5:
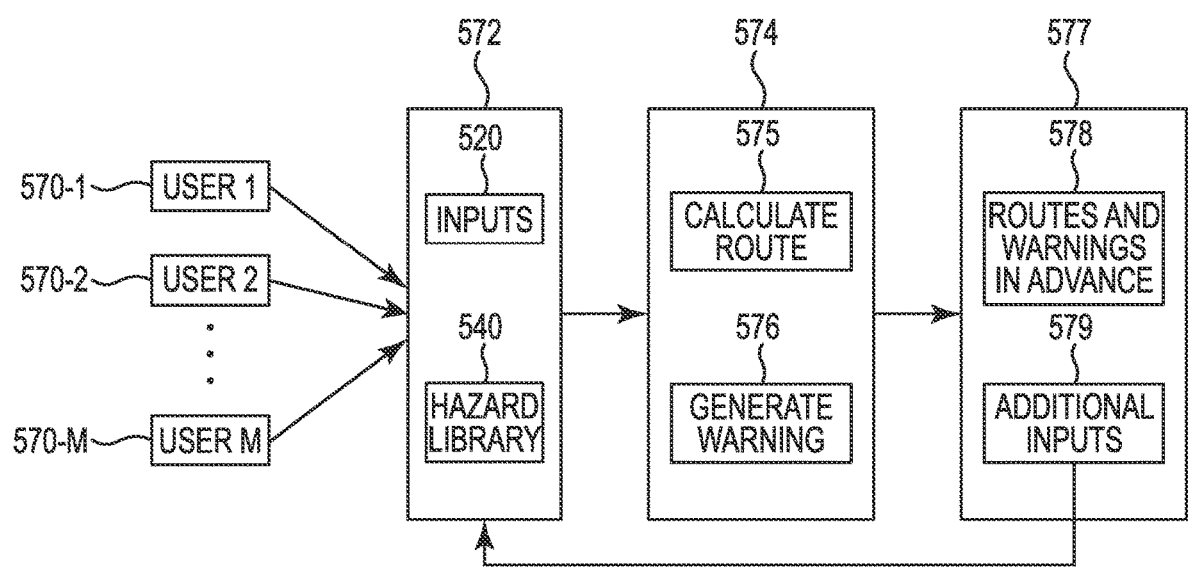
FIG. 5 is a flow diagram representing an example method for indicating a hazard in accordance with a number of embodiments of the present disclosure.

FIG. 5 is a flow diagram representing an example method for indicating a hazard in accordance with a number of embodiments of the present disclosure. In FIG. 5, users 570-1, 570-2, and 570-M can provide inputs 520 to a hazard indication tool. Users 570-1, 570-2, and 570-M can provide sensor data from their mobile devices as inputs to the hazard indication tool. The hazard indication tool can receive inputs 520 to make a determination whether hazards hazard exist and determine details, such as location, type, and/or temporal information, regarding hazards 572. The hazard indication tool can store information regarding hazards in the hazard library 540.

Once the hazard indication tool has determined that a hazard exists, an output can be generated 574. The output that can be generated can include calculating a route 575 to avoid a hazard and/or generate a warning 576 regarding the hazard.

The hazard indication tool can be used by a number of users 577 to inform the number of user of hazards by provide routes and warnings in advance 578 based on the information in the hazard library 540. The routes and warning 578 can be provided to users of the hazard indication tool to allow them to be informed of hazards before they begin their journeys and allow to the plan alternate routes to avoid hazards. The users of the hazard indication tool can also provide additional inputs 579 to the hazard indication tool. The additional inputs 579 can include data that provide more details regarding hazards, such that the hazard still exists. The additional inputs 579 can be manually entered by user of the hazard indication tool and/or can be from sensor of user's mobile device as the users are on their journey.

Figure 6:
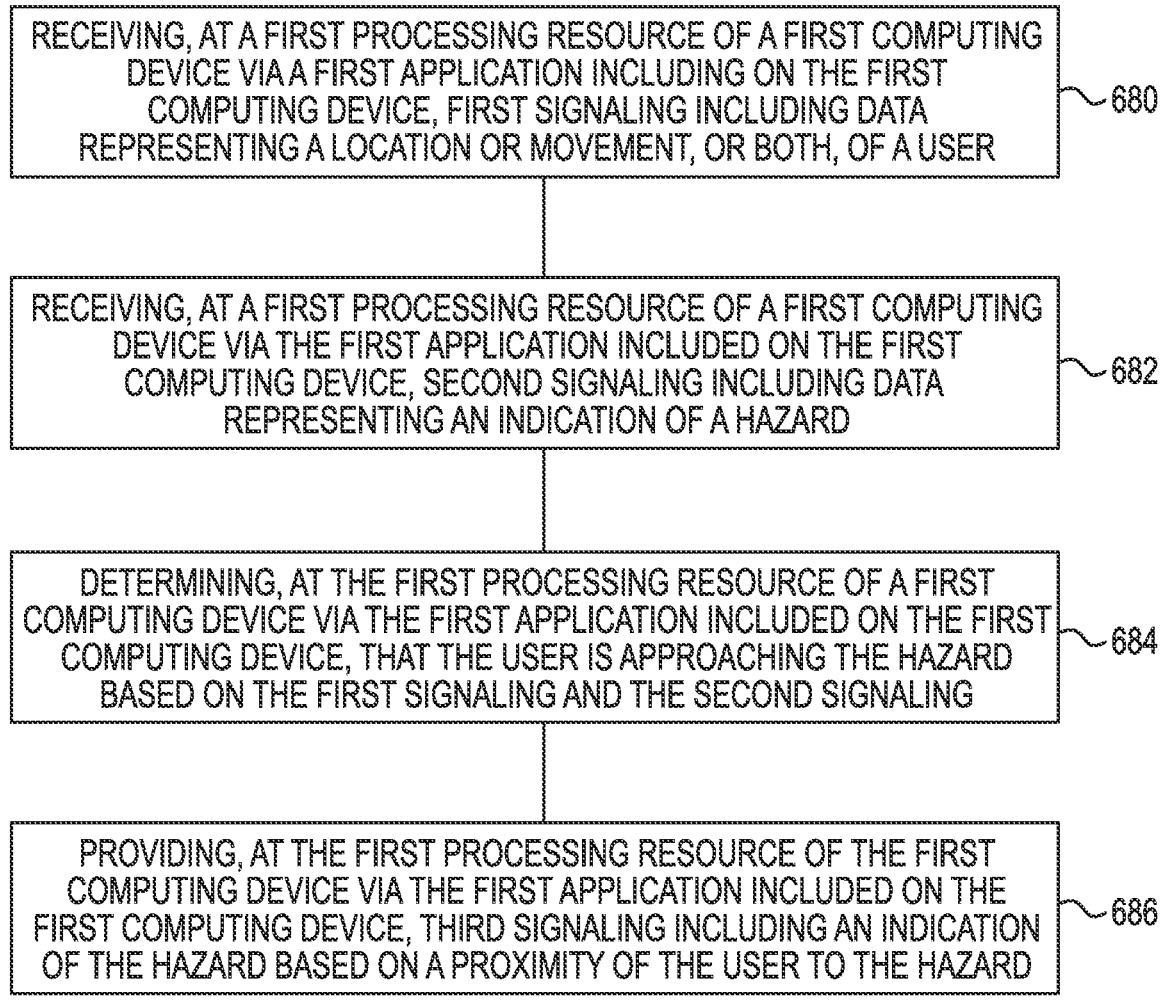
FIG. 6 is flow diagram representing an example method for indicating a hazard in accordance with a number of embodiments of the present disclosure.

FIG. 6 is flow diagram representing an example method for indicating a hazard in accordance with a number of embodiments of the present disclosure. At 680, the method includes receiving, at a first processing resource of a first computing device via a first application included on the first computing device, first signaling including data representing a location or movement, or both, of a user.

At 682, the method includes receiving, at the first processing resource of the first computing device via the first application included on the first computing device, second signaling including data representing an indication of a hazard.

At 684, the method includes determining, at the first processing resource of the first computing device via the first application included on the first computing device, that the user is approaching the hazard based on the first signaling and the second signaling.

At 686, the method includes providing, at the first processing resource of the first computing device via the first application included on the first computing device, third signaling including an indication of the hazard based on a proximity of the user to the hazard.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
receiving, at a first processing resource of a first computing device via a first application included on the first computing device, first signaling including data representing a location or movement, or both, of a user;
receiving, at the first processing resource of the first computing device via the first application included on the first computing device, second signaling including data representing an indication of a hazard;
determining, at the first processing resource of the first computing device via the first application included on the first computing device, that the user is approaching the hazard based on the first signaling and the second signaling;

providing, at the first processing resource of the first computing device via the first application included on the first computing device, third signaling including an indication of the hazard based on a proximity of the user to the hazard; and providing, at the first processing resource of the first computing device via the first application included on the first computing device, fourth signaling including an indication of a route for the user to travel to avoid the hazard and provide the indication of the route to avoid the hazard to an application on another computing device.

2. The method of claim 1, further comprising providing, at a second computing device via the first application included on the second computing device, the indication of the hazard to other users based a proximity of the other users to the hazard.

3. The method of claim 1, wherein the second signaling includes image data that indicates the hazard.

4. The method of claim 1, wherein the second signaling includes audio data that indicates the hazard.

5. The method of claim 1, wherein providing the indication of the hazard includes an audible warning of the hazard.

6. The method of claim 1, wherein providing the indication of the hazard includes a visual warning of the hazard.

7. The method of claim 1, wherein providing the indication of the hazard includes a vibration warning of the hazard.

8. The method of claim 1, further includes providing, at a second computing device via the first application included on the second computing device, an update to the indication of the hazard to other users.

9. An apparatus, comprising:
a memory;
a user interface;
a number of sensors; and
a processing resource configured to execute instructions stored in the memory to:
receive first signaling including data representing a location or movement, or both, of a user;
receive second signaling including data representing an indication of a hazard based on inputs of the number of sensors;
determine that the user is approaching the hazard based on the first signaling and the second signaling;
provide, via the user interface, third signaling including an indication of the hazard based on a proximity of the user to the hazard; and
provide a route for the user to travel to avoid the hazard and provide the route to avoid the hazard to an application on another computing device.

10. The apparatus of claim 9, wherein the processing resource is configured to execute instructions to provide the third signaling including the indication of the hazard to an application on another computing device.

11. The apparatus of claim 9, wherein the apparatus is configured to receive fourth signaling indicating an update on a status of the hazard from the application the another computing device.

12. A non-transitory machine-readable medium comprising a first processing resource in communication with a memory resource having instructions executable to:
receive at the first processing resource, the memory resource, or both, data representing a location or movement, or both, of a user, via first signaling sent via a radio in communication with a processing resource of a mobile device of the user;
receive at the first processing resource, the memory resource, or both, data representing an indication of a hazard via second signaling sent via the radio in communication with the processing resource of the mobile device of the user;
determine at the first processing resource, the memory resource, or both, that the user is approaching the hazard based on the first signaling and the second signaling; and
transmitting an indication from the first processing resource, the memory resource, or both to the user an indication of the hazard based on a proximity of the user to the hazard.

13. The medium of claim 12, further including transmitting the indication to a computing device of the user.

14. The medium of claim 12, further including transmitting the indication to a number of computing devices that operate an application.

15. The medium of claim 14, further including receiving at the first processing resource, the memory resource, or both, data representing the indication of the hazard via signaling sent from the number of computing devices in communication with the first processing resource via the application.

16. The medium of claim 15, further including transmitting an update to the indication of the hazard to the number of computing devices that operate the application in response to the first processing resource receiving the data representing the indication of the hazard from the number of computing devices.

17. The medium of claim 12, further including transmitting an indication that the hazard is no longer present to a number of computing devices that operate an application.

* * * * *